United States Patent [19]
Brown et al.

[11] 3,726,926
[45] Apr. 10, 1973

[54] PROCESS FOR PREPARING N-ALKYLAMINES

[75] Inventors: Patrick M. Brown, Baltimore; James M. Maselli, Ellicott City, both of Md.

[73] Assignee: W. R. Grace & Co., New York, N.Y.

[22] Filed: Mar. 19, 1971

[21] Appl. No.: 126,281

[52] U.S. Cl............260/585 R, 252/466 J, 260/583 R
[51] Int. Cl..........................C07c 85/00, C07c 85/02
[58] Field of Search........................260/583 R, 585 R

[56] References Cited

OTHER PUBLICATIONS

Bashkirov et al., "Chemical Abstracts," Vol. 57 (1962) page 16373.

*Primary Examiner*—Lewis Gotts
*Assistant Examiner*—Richard L. Raymond
*Attorney*—Kenneth E. Prince

[57] ABSTRACT

A process for the manufacture of N-alkylamines from hydrogen, carbon monoxide, and ammonia wherein a catalyst comprising 70–98 weight percent of a Group VIII metal, 0.01–20 weight percent of a Group III metal, and 0.01–20 weight percent of either a Group IA or IIA metal is used.

4 Claims, No Drawings

PROCESS FOR PREPARING N-ALKYLAMINES

BACKGROUND OF THE INVENTION

1. Prior Art

It is well known in the art that alkyl amines can be prepared from alcohols or ethers which are admixed in vapor phase, together with ammonia or an amine over a dehydrating catalyst. However, alcohols or ethers are comparatively expensive reactants. Further, when these reactants are used, only a small proportion of the reacting materials are actually converted to amines.

It is also generally known that admixing of carbon monoxide, hydrogen, and ammonia under extremely high temperatures will produce alkyl amines. However the temperature required has until now been too high to obtain high yields and make such a process economically feasible. U. S. Pat. No. 3,410,904 discloses a method of preparing trimethylamine from carbon monoxide, hydrogen, and ammonia. The catalyst used in said patent incorporates metals which are Group VIII–C–Group I–B metals of atomic number from 29 – 79. However this catalyst is apparently only adequate for producing trimethyl amine.

The uses of alkylamines is well known in the art. In particular they are useful as plasticizers, surface active agents, deflocculating agents, intermediates for rubber chemicals, dyestuffs, textiles and leather finishing resins, pharmaceuticals, petroleum additives, and agricultural chemicals, corrosion inhibitors, antioxidants. The fatty amines (eight to 22 carbon atoms) find various uses in the plastics and protective coating industry such as mold release agents, emulsion freeze-thaw stabilizers, pigment dispensing or flushing agents, and polyurethane catalysts. They are also used in the petroleum industry as corrosion inhibitors, compounding of lubricating oils and greases and as detergents, de-icers, and corrosion inhibitors in gasoline.

Thus, it can be seen there is a great need for alkylamines. There is therefore also a need for a process for preparing alkylamines wherein the process is economically sound. There is, in turn, a need for a catalyst which enables N-alkylamines to be produced from inexpensive reactants (hydrogen, carbon monoxide, and ammonia).

2. Objects of the Invention

It is therefore an object of this invention to provide a process for preparing n-alkylamines from the inexpensive materials of carbon monoxide, hydrogen, and ammonia. More particularly, it is an object of this invention to provide an approved process for preparing n-alkylamines having three to 22 carbon atoms. It is also, therefore, an object of this invention to provide a catalyst which is capable of producing n-alkylamines when carbon monoxide, hydrogen, and ammonia are reacted in its presence.

Other objects of this invention will be apparent to those skilled in the art as the description of this invention proceeds.

SUMMARY OF THE INVENTION

This invention is a process for the preparation of n-alkylamines wherein a catalyst comprising 70–98 percent by weight of a Group VIII metal, 0.01–20 weight percent of a Group IIIA metal and 0.01–20 weight percent of a Group IA or IIA metal is used as a catalyst. In this preparation hydrogen, carbon monoxide, and ammonia are intimately contacted in the presence of the catalyst. This invention, then, is the preparation of n-alkylamines using the specific catalyst of this invention, the specific catalyst itself, and the process for preparing a specific catalyst.

The catalyst, also referred to herein as an amine catalyst, is a homogeneous composition of a Group VIII metal oxide, a Group IIIA metal oxide and a Group IA or IIA metal oxide. Preferably the Group VIII metal is iron, the Group IIIA metal is aluminum, and the Group IA or IIA metal is barium. Preferably, the catalytic composition is 80–95 percent by weight iron oxide, 2–8 percent by weight aluminum oxide, and 1–10 percent by weight barium oxide. The catalyst may also contain an inert support unit, e.g. silica, diatomaceous earth, etc.

DETAILED DESCRIPTION OF THE INVENTION

This invention is a process for preparing n-alkylamines by intimately contacting carbon monoxide, hydrogen and nitrogen in the presence of a metal catalyst wherein the metal catalyst is a composition which comprises 70–98 weight percent of a Group VIII metal, 0.01–20 weight percent of a Group III metal and 0.01–20 weight percent of either a Group IA or IIA metal, each metal being in the oxide form. Preferably the metal catalyst has been nitrided.

The components of the metal catalyst of this invention are preferably iron (Group VIII), aluminum (Group IIIA), and barium (Group IIA). As these are the preferred components, reference to these components in the specification and claims is understood to include the other appropriate group members. The metal catalyst used in the process of this invention is prepared by admixing iron and aluminum salts in a mole ratio of 5–20:0.8–1.2. The particular iron and aluminum salt which is used is, of course, not critical to the successful preparation of the catalyst. Some of the desirable salts include the nitrates, chlorides, sulfates etc.

The iron and aluminum salts are dissolved in a sufficient amount of water to assure essentially complete dissolution. A sufficient amount of a base, e.g., ammonium hydroxide, is then added to the iron-aluminum aqueous solution to precipitate a co-gel. The co-gel is actually a gel composed of the precipitated oxides or hydrous oxides of the aluminum and iron salts. Following the precipitation of the co-gel by the base, the barium salt, e.g., oxide, is added. The mole ratio of iron to barium is in the range of 5–20:0.8–1.2.

Again, the particular Group IA and IIA metal chosen is not critical, and reference to barium is to be understood to be reference to the other Group IA and IIA metals. Following the addition of the barium, moisture is removed from the composition and the thus formed catalyst is recovered.

It is to be further understood that the catalyst of this invention can be prepared in other ways besides those described here. The method used herein is one preferred method among others.

The product which is obtained by the heretofore described process is a homogeneous composition which comprises 70–89 weight percent of a Group VIII metal, 0.01–20 weight percent of a Group IIIA metal, and 0.01–20 weight percent of a Group IA or IIA metal said metals being in the oxide form. Preferably the Group VIII metal is 80–95 weight percent of the composition, the Group IIIA metal is 2–8 weight percent of the catalyst and the Group IA or IIA metal is 0.1–10 weight percent of the catalyst.

Although any of the Group VIII metals are operable, it has been observed that the Group VIIIA (the first family of Group VIII metals) which consist of iron, ruthenium, and osmium, are preferable and iron is most preferable. The Group IIIA metals include aluminum, gallium, indium, thallium, and the aluminum metal is preferred. The groups IA and IIA metal which is preferred is barium.

The Group IIIA metal which is used is used for the purpose of inhibiting the growth of the Group VIII metal and could be referred to therefore as a "growth inhibitor." Without the presence of the growth inhibitor there would be very little surface area in the Group VIII metal. Thus the crystallite size which is acquired is quite dependent upon the amount of growth inhibitor which is used. Without the growth inhibitor a metal with very little surface area is obtained, thus reducing the effectiveness of the catalyst.

The Group IA or IIA metal which is used is basically for product desportion, i.e., preventing the products (n-alkylamines) which are formed from remaining secured to the catalyst. Without the use of such a desorption material, the n-alkylamines would remain attached to the catalyst. With the use of the Group IA or IIA metal the product is easily separated from the catalyst. Furthermore, the desorption material prevents complete coverage of the catalyst surface with only the ammonia reactant.

It is also preferable that the catalyst composition be nitrided as it has been found that the catalyst is more efficient after nitriding. Nitriding can be accomplished by heating the catalyst composition in a hydrogen atmosphere to a temperature in the range of 350°–500° C. for a period of 2–24 hours, thereby reducing the metal catalyst. It has also been found that if the metal catalyst is reduced too fast, water forms and damages the catalyst so as to decrease the ability of the catalyst to facilitate amine production. After reducing, the metal catalyst is then contacted with ammonia at a temperature in the range of 350°–500° C. for 2 - 24 hours.

In the actual preparation of the n-alkylamines having three to 22 carbon atoms, carbon monoxide, hydrogen, and ammonia are intimately contacted in the presence of the catalyst described heretofore. The mole ratio of ammonia:carbon monoxide:hydrogen is about 0.03–0.5:0.8–1.2:1–3. The type of N-alkylamine chain which is desired can be controlled by varying the mole ratios of the reactants. If short chains are desired, excess ammonia is used, thereby stopping the chain growth. Of course, then, if a low proportion of ammonia, i.e., excess carbon monoxide and hydrogen, is used, long chain n-alkylamines are obtained since there is insufficient amination to stop the chain growth. The chain lengths can also be controlled by varying the hydrogen to carbon ratio. If there is a high hydrogen to carbon ratio, short chains are produced due to the lack of carbon atoms. A low hydrogen to carbon ratio tends to favor the production of long chain n-alkylamines due to the availability of carbon atoms.

The reactants are intimately contacted in the presence of the amine catalyst at a temperature in the range of 160°–220° C. and at a pressure in the range of 30 to 200 atmospheres. Without the use of the amine catalyst the reaction does not take place except at extremely high unworkable temperatures. It is ideally desired to have the greatest possible conversion of reactants at the lowest possible temperatures. The low temperatures are favorable in order to extend the life of the catalyst and increase the selectivity, i.e., chain length size, of the reaction for amine formation. Ideally, then, maximum conversion of the reactants at low temperature is desired.

The use of the amine catalyst disclosed herein enables the operating temperature to be 160°–220° C. when producing n-alkylamines. At this temperature a mixture of amines and hydrocarbons is produced. Separation is easily accomplished and if desired, the hydrocarbons can be reoxidized and recycled as carbon monoxide and hydrogen to the reaction area to be converted to the n-alkylamines.

There are of course many advantages in the use of the catalyst of this invention. High conversions of the reactants at low temperatures are obtained when the catalyst of this invention is used. Because of the low temperatures and high conversions there is a high yield of n-alkylamines, the catalyst exhibits good stability, and more n-alkylamines can be obtained per unit of catalyst then when the conventional, e.g., cobalt or copper catalysts are used. The process of this invention can of course, be adapted for operation in a large scale manner. Preferably the process is conducted in a continuous manner by passing the reactants through a reactor containing the catalyst which is maintained at the reaction temperature and pressure. Generally the entire amounts of the reactants are premixed although it is possible to add the reactants at intervals. Following the reaction, the N-alkylamines which are produced are separated from the unreacted components and hydrocarbons and are recovered by conventional methods, e.g., adsorption, precipitation by acidification and the like.

To summarize, this invention is a process of preparing n-alkylamines by intimately contacting ammonia, carbon monoxide, and hydrogen in the presence of a metal catalyst wherein said metal catalyst comprises a first member selected from the group consisting of Group VIII metal oxides, a second member selected from the Group consisting of Group IIIA metal oxides, and a third member selected from the group consisting of Groups IA and IIA metal oxides at a temperature of from about 160° –220° C. and 50 to 200 atmospheres. The metal catalyst is prepared by dissolving a Group VIII salt and Group IIIA salt in a mole ratio of Group VIII salt to Group IIIA salt of about 5 - 20:0.8–1.2; precipitating a co-gel from the aqueous solution by adding a base with rapid mixing; treating the co-gel with an aqueous solution containing a Group IA or IIA metal oxide such that the mole ratio of Group VIII member to Group IA or IIA member is in the range of about 5–20:0.8–1.2 thereby forming a composition; removing moisture from the composition and recovering the thus prepared catalyst.

We have also found that the amines chain length is affected when other metal salts such as zinc and copper are included in the metal catalyst. For example, the addition of a small amount of zinc encourages formation of $C_6$–$C_8$ amines and the addition of a small amount of copper encourages formation of $C_5$–$C_6$ amines (See Examples 5-6).

It is preferred that the metal catalyst be nitrided and this is accomplished by slowly reducing the metal catalyst via a slow heating of the material to a temperature in the range of 350° – 500° C. in a hydrogen atmosphere for 2-24 hours to form a reduced metal catalyst; and nitriding the reduced metal catalyst by heating the said metal catalyst in an ammonia atmosphere at a temperature in the range of 350° – 500° C. for 2 – 24 hours.

To illustrate further the process of this invention the following examples are provided. It is to be understood however that the details in the following examples are not intended as limitations, as they may be varied as will be understood by one skilled in the art.

EXAMPLE 1

Six pounds of $FE(NO_3)_3 \cdot 9H_2O$ and 191 g. of $Al(NO_3)_3 \cdot 9H_2O$ were dissolved in 2.5 gal. of deionized water. Sufficient ammonium hydroxide was added to the solution to raise the pH to 7.5 and with high speed stirring a co-gel was precipitated. The resulting precipitate was treated with an aqueous solution of barium oxide containing 80 g· $Ba(OH)_2 \cdot 8H_2O$ so as to obtain a composition which analyzed at 88.88 percent by weight at $Fe_3O_4$, 4.44 percent $Al_2O_3$ and 6.68 percent BaO. This material was then milled at 400° C. to remove moisture and form a a homogeneous material. The material was then pelletized, reduced under hydrogen at 440° C. for 8 hours, and nitrided at 440° C. by contacting the reduced catalyst with ammonia for 8 hours. The catalyst was then labeled "Catalyst 1."

EXAMPLE 2

Example 1 was repeated except that the co-gel was treated with a solution of $Ba(OH)_2 Zn(NH_3)_4(NO_3)_2$ to thereby obtain a final composition analyzing at 85.1 percent $Fe_3O_4$, 4.26
percent $Al_2O_3$, 4.26 percent ZnO, and 6.4 percent BaO. This catalyst was also reduced and nitrided as in Example 1 and was labeled "Catalyst 2."

EXAMPLE 3

Example 1 was repeated except that the precipitate was treated with $Ba(OH)_2$ and $Cu(NH_3)_2$ to thereby obtain a final composition 85.1 percent $Fe_3O_4$, 4.26 percent $Al_2O_3$, 4.26 percent CuO, and 6.4 percent BaO. This catalyst was labeled "Catalyst 3" after being reduced and nitrided as in Example 1.

EXAMPLES 4-6

Catalyst 1, 2 and 3 were evaluated in a fixed bed reactor for the activity of forming n-alkylamines from hydrogen, carbon monoxide and ammonia. Three reactants, hydrogen, carbon monoxide and ammonia were passed into three fixed beds, each containing one of the three catalysts (see Table 1 below). The temperature in the fixed bed was 200° C., the pressure was about 100 atmospheres, and the space velocity was 4,000 hr.$^{-1}$. The mole ratio of the ammonia: carbon monoxide:hydrogen was about 0.3:1:2. The n-alkylamines which were obtained were found upon analysis to have chain lengths of three to 22 carbon atoms. The percent of conversion (i.e. amine selectivity) is shown in Table 1. The chain lengths and quantity of each amine were determined by gas chromatography. The results are given in Table 2.

TABLE 1

| Example No. | Catalyst No. | Amine Selectivity* |
|---|---|---|
| 4 | 1 | 35 |
| 5 | 2 | 25 |
| 6 | 3 | 10 |

*The amine selectivity represents the percentage of product which is N-alkylamines. The remainder of the final product is a mixture of reactants and hydrocarbons.

TABLE 2

The weight percent distribution of amines by chain length in the amine fraction for each catalyst:

| Catalyst No. | 1 | 2 | 3 |
|---|---|---|---|
| Example No. | 4 | 5 | 6 |
| $C_1$ | 5.8 | | |
| $C_2$ | 6.7 | | |
| $C_3$ | 8.3 | 3.9 | 1.7 |
| $C_4$ | 14.3 | 9.6 | 11.9 |
| $C_5$ | 12.8 | 12.6 | 23.6 |
| $C_6$ | 11.3 | 14.3 | 22.3 |
| $C_7$ | 9.8 | 17.2 | 10.5 |
| $C_8$ | 8.5 | 15.7 | 9.7 |
| $C_9$ | 5.6 | 10.4 | 7.2 |
| $C_{10}$ | 5.6 | 8.5 | 4.8 |
| $C_{11}$ | 3.2 | 5.2 | 3.8 |
| $C_{12}$ | 2.9 | 2.6 | 2.5 |
| $C_{13}$ | 2.4 | Trace | 1.2 |
| $C_{14}$ | 1.5 | Trace | 0.6 |
| $C_{15}$ | 1.0 | | 0.2 |
| $C_{16}$ | 0.5 | | |

EXAMPLE 7

Example 4 was repeated except that the mole ratio of reactants was 0.03:1.2:3 (amminia:carbon monoxide:hydrogen. The product obtained was determined (as in Example 4) to be n-alkylamines having 17–22 carbon atoms. The amine selectivity was about 35 percent.

EXAMPLE 8

Example 4 was repeated except that the mole ratio of the reactants was about 0.5:0.8:2 (ammonia:carbon monoxide:hydrogen). The product obtained was determined (as in Example 4) to be n-alkylamines having three to six carbon atoms. The amine selectivity was about 40 percent.

EXAMPLE 9

Example 1 was repeated except that the catalyst was recovered after moisture was removed and not nitrided. The catalyst obtained was labeled "Catalyst 4."

EXAMPLE 10

Example 4 was repeated except that "Catalyst 4" was used in place of "Catalyst 1." The product obtained was determined (as in Example 4) to be n-alkylamines having three to 22 carbon atoms. The amine selectivity was 20 percent.

It is claimed:

1. A process for preparing N-alkylamines having three to 32 carbon atoms in the molecule by contacting a gaseous feed consisting of about 0.3 – 0.5 moles of ammonia, to 0.8 – 1.2 moles of carbon monoxide, to 1 – 3 moles of hydrogen, at a temperature of about 160° to 220° C and a pressure of 50 – 200 atmospheres with a catalyst consisting of 80 – 95 parts of iron oxide, 2 – 8 parts of aluminum oxide and 0.1 – 10 parts of barium oxide and recovering the N-alklamine product.

2. A process for preparing N-alkylamines having 3 – 32 carbon atoms in the molecule by contacting a gaseous feed consisting of about 0.3 — 0.5 moles of ammonia, 0.8 — 1.2 moles of carbon monoxide and 1 – 3 moles of hydrogen at a temperature of 160° to 220° C and a pressure of 50 – 200 atmospheres with a catalyst consisting of 80– 95 parts of iron nitride, 2 – 8 parts of aluminum nitride, and 0.1 – 10 parts of barium nitride, and recovering the N-alkylamine product.

3. The process according to claim 1 wherein said N-alkylamines have three to 22 carbon atoms in the molecule.

4. The process according to claim 2 wherein said N-alkylamines have three to 22 carbon atoms in the molecule.

* * * * *